United States Patent [19]

Ikemoto et al.

[11] Patent Number: 4,674,614

[45] Date of Patent: Jun. 23, 1987

[54] GEAR SYNCHRONIZER ASSEMBLY FOR POWER TRANSMISSION

[75] Inventors: Kazuhito Ikemoto; Yukio Terakura; Yasumichi Funato, all of Toyota, Japan

[73] Assignee: Toyota Jidosha Kabushiki Kaisha, Aichi, Japan

[21] Appl. No.: 791,947

[22] Filed: Oct. 28, 1985

[30] Foreign Application Priority Data

Nov. 2, 1984 [JP] Japan .......................... 59-167303[U]

[51] Int. Cl.⁴ ........................................ F16D 11/00

[52] U.S. Cl. ................................... 192/53 F; 74/339

[58] Field of Search ................. 192/53 A, 53 E, 53 F; 74/339

[56] References Cited

U.S. PATENT DOCUMENTS

| | | | |
|---|---|---|---|
| Re. 22,265 | 2/1943 | White | 192/53 R |
| 2,190,964 | 2/1940 | White | 192/53 A |
| 2,364,331 | 12/1944 | White | 192/53 F |
| 2,375,790 | 5/1945 | Iavelli et al. | 192/53 R |
| 3,548,983 | 12/1970 | Hiraiwa | 192/53 F |
| 3,578,122 | 5/1971 | Magnier | 192/107 R |
| 3,700,083 | 10/1972 | Ashikawa | 192/53 F |
| 3,861,509 | 1/1975 | Inoue et al. | 192/53 F |
| 4,132,122 | 1/1979 | Richards | 74/339 |
| 4,270,639 | 6/1981 | Johnsson | 192/53 F |
| 4,625,844 | 12/1986 | Ikemoto | 192/53 F |

FOREIGN PATENT DOCUMENTS

| | | | |
|---|---|---|---|
| 0090084 | 10/1983 | European Pat. Off. | |
| 0933364 | 8/1955 | Fed. Rep. of Germany | |
| D.. | | | |
| 19783II/63C | 12/1956 | Fed. Rep. of Germany | 192/53 F |
| 2331053 | 1/1975 | Fed. Rep. of Germany | |
| 3310749 | 10/1983 | Fed. Rep. of Germany | |
| 554048 | 1/1957 | Italy | |
| 55-4047 | 1/1957 | Italy | |
| 55-100428 | 7/1980 | Japan | |
| 58-137627 | 8/1983 | Japan | |
| 58-163829 | 9/1983 | Japan | |
| 58-174724 | 10/1983 | Japan | |
| 1314851 | 4/1973 | United Kingdom | |
| 1502346 | 3/1978 | United Kingdom | |

*Primary Examiner*—John E. Murtagh
*Assistant Examiner*—Andrew Joseph Rudy
*Attorney, Agent, or Firm*—Parkhurst & Oliff

[57] ABSTRACT

In a gear synchronizer assembly of the well-known type, a clutch sleeve is formed at its inner periphery with at least one first internal radial projection of large width and a pair of circumferentially spaced second internal radial projections of small width arranged at opposite sides of the first internal radial projection, a synchronizer ring being formed thereon with a pair of raised portions to be engaged with the first internal radial projection and another pair of raised portions to be engaged with the second internal radial projections. A thrust mechanism comprising a radially contractible annular spring is supported in place by engagement with the inner circumference of a cylindrical hub portion of a hub member fixed to a transmission shaft. The annular spring has an axial leg extending therefrom toward the first internal radial projection, and having a radial projection which is arranged to be engaged with the first internal radial projection in shifting operation of the clutch sleeve toward a spline piece integral with a change-speed gear and arranged to abut against and urge the synchronizer ring toward the spline piece upon engagement with the first internal radial projection.

4 Claims, 6 Drawing Figures

II
12
23
14
14
23
22
22
13
13
11
21
II

IV
III
13b
12e
12b
12e
12c
12c
13d
11c
12a
11a
V
VI
VI
12a
13d
14b
13b
11b
IV
11a
V
13
11
12
III
11c
14
13d
12c
12f
14a
12f
14b
13b
14b
12e
12e
13d
12b
12b
12c
12f
12f 12
13c
12e
13c
23b
11c
14
13b
13b
14
23
23
12b
14a
14a
13
12d
13
13a
23a
14b
11
14b
23a
13a 12
13e
12f
13e
14
13d
13d
14
11c
12c
23
14a
23
13
11
13

12
11b
12a
23b
14
11a
14
23
23
13
11
13

GEAR SYNCHRONIZER ASSEMBLY FOR POWER TRANSMISSION

BACKGROUND OF THE INVENTION

The present invention relates to a gear synchronizer assembly for power transmissions, and more particularly to a gear synchronizer mechanism of the type which comprises a gear member rotatably mounted on a transmission shaft, a spline piece mounted on a hub portion of the gear member for rotation therewith and being formed at one side thereof with a conical portion and thereon with external spline teeth, a synchronizer ring mounted on the conical portion of the spline piece for frictional engagement therewith, a hub member fixed to the transmission shaft for rotation therewith and being formed thereon with external spline teeth, a clutch sleeve encircling the hub member and having internal spline teeth in continual engagement with the external spline teeth of the hub member, the clutch sleeve being axially shiftable to be engaged at the internal spline teeth thereof with the external spline teeth of the spline piece, and thrust means for thrusting the synchronizer ring toward the spline piece in shifting operation of the clutch sleeve to effect the frictional engagement between the synchronizer ring and the spline piece.

In such a conventional gear synchronizer means as described above, the thrust mechanism comprises a plurality of circumferentially spaced strut keys each having a raised portion in engagement with the corresponding recess in the inner peripheral wall of the clutch sleeve, and an annular retainer spring arranged to bias the strut keys radially outwardly for engagement with the clutch sleeve. To simplify the thrust means in construction, an improved thrust means has been proposed in Japanese Early Patent Publications Nos. 55-100428, 58-137627, 58-163829, and 58-174724, wherein the strut keys and retainer spring are replaced with a single thrust element. It is, however, difficult to enhance productivity of the gear synchronizer mechanism because the single thrust element is complicated in configuration and construction.

To overcome the shortcomings of such a conventional thrust means as described above, an improved gear synchronizer mechanism has been proposed by the inventors in a copending U.S. patent application No. 677,748, filed on Dec. 3, 1984, now U.S. Pat. No. 4,625,844, wherein the clutch sleeve is formed at its inner periphery with at least one internal radial projection, and wherein the thrust means comprises a radially contractible annular resilient member supported in place by engagement with the inner circumference of a cylindrical hub portion of the hub member, the annular resilient member having an axial leg extending therefrom toward the internal radial projection of the clutch sleeve and having a radial projection arranged to be brought into engagement with the internal radial projection of the clutch sleeve and arranged to abut against and urge the synchronizer ring toward the spline piece upon engagement with the internal radial projection of the clutch sleeve, the axial leg of the annular resilient member being arranged to be compressed radially inwardly by engagement with the internal radial projection of the clutch sleeve.

In the above-described synchronizer mechanism, the synchronizer ring is integrally formed thereon with a pair of raised portions which are formed with a chamfer at each end thereof, and the internal radial projection of the clutch sleeve is formed at one side thereof with a pair of chamfers to be engaged with the chamfers of the raised portions on the synchronizer ring and arranged to pass through an axial groove between the raised portions of the synchronizer ring. In operation, the internal radial projection of the clutch sleeve is engaged at its chamfers with the chamfers of the synchronizer ring to establish a frictional driving connection between the parts to be brought into synchronization. For this reason, if the number of internal radial projections is reduced, there will occur a problem in durability of the radial projections due to increase of the pressure acting thereon. If the number of internal radial projections is increased, there will occur undesired disengagement between the intermeshed spline teeth in deceleration due to reduction of the number of internal spline teeth of the clutch sleeve to be meshed with the teeth of the gear member.

SUMMARY OF THE INVENTION

It is, therefore, a primary object of the present invention to provide an improved gear synchronizer mechanism, wherein the thrust means is constructed to enhance the durability of the clutch sleeve without causing disengagement of the intermeshed spline teeth in a shifted condition of the synchronizer mechanism.

According to the present invention, there is provided a gear synchronizer mechanism wherein the clutch sleeve is formed at its inner periphery with a first internal radial projection of large width arranged to be engaged with the axial leg of the annular resilient member and a pair of circumferentially spaced second internal radial projections of small width arranged at opposite sides of the first internal radial projection, the first and second internal radial projections each being formed at one side thereof with a pair of chamfers, and wherein the synchronizer ring is formed thereon with a pair of raised portions which are respectively chamfered at one end thereof to be engaged with the chamfers of the first internal radial projection, the synchronizer ring being further formed thereon with another pair of raised portions which are respectively chamfered at one end thereof to be engaged with the chamfers of the second internal radial projections.

BRIEF DESCRIPTION OF THE DRAWINGS

Additional objects, features and advantages of the present invention will become more readily apparent from the following detailed description of a preferred embodiment thereof when considered with reference to the attached in which.

DETAILED DESCRIPTION OF THE PREFERRED EMBODIMENT

Figure 1:
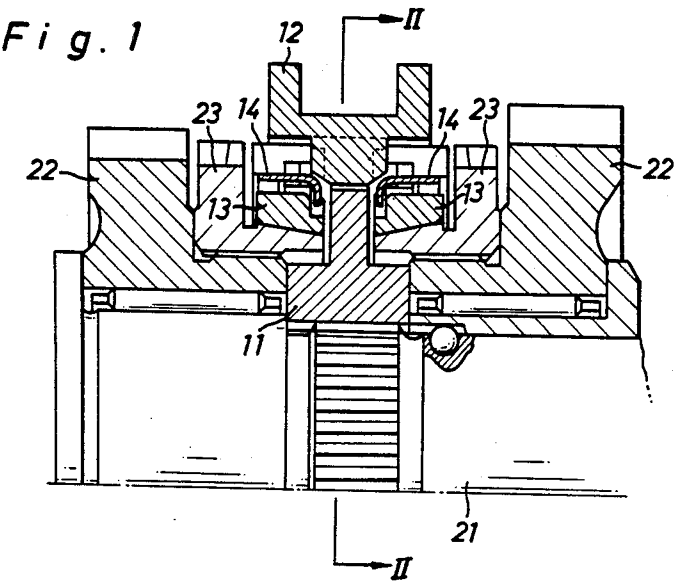
Fig. 1 illustrates in cross-sectional form one of circumferentially equi-spaced parts of a gear synchronizer mechanism in accordance with the present invention.
Figure 2:
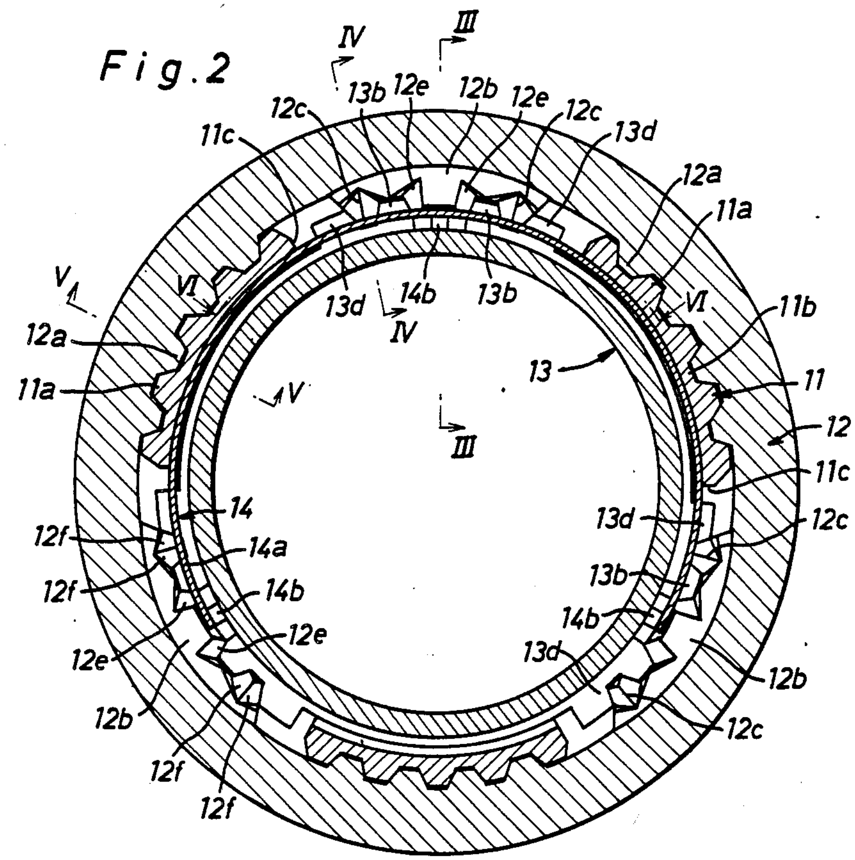
FIG. 2 is a cross-sectional view taken along line II—II in FIG. 1.
Figure 5:
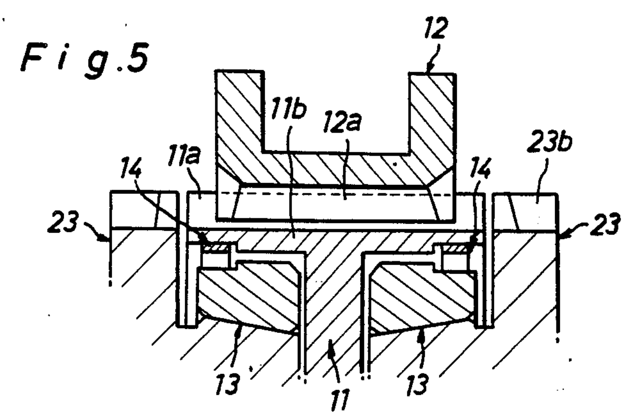
FIG. 5 is an enlarged cross-sectional view taken along line V—V in FIG. 2.

Referring now to the drawings, where like reference numerals represent the same or corresponding parts throughout the figures, there is illustrated in FIG. 1 a transmission shaft 21, on which are rotatably supported a pair of change-speed gears 22 and 22. Disposed between the change-speed gears 22 and 22 is a pair of synchronizer assemblies which are operable to cause selective speed synchronization between the shaft 21 and the gears 22 and 22, respectively. As is illustrated in FIGS. 1 and 2, the synchronizer assemblies have a commcn hub assembly which includes a hub member 11, and a pair of radially contractible annular resilient member 14, 14. The synchronizer assemblies are arranged to be operated through a clutch sleeve 12 which is connected by a yoke groove to a conventional manually operated shift mechanism (not shown). The hub member 11 is fixed at its inner hub portion to the transmission shaft 21 by means of a spline connection for rotation therewith. As can be well seen in FIGS. 2 and 5, the hub member 11 is integrally formed with an outer cylndrical hub portion **11*b* which is formed thereon with external spline teeth 11*a*. The clutch sleeve 12 is arranged in surrounding relationship with the outer cylindrical hub portion 11*b* of hub member 11 and has internal spline teeth 12*a* in continual engagement with the external spline teeth 11*a* of hub member 11. The clutch sleeve 12 is axially shiftable to be engaged at the internal spline teeth thereof with external spline teeth 23*b* of a spline piece 23**.

The left-hand synchronizer assembly is substantially the same as the right-hand synchronizer assembly such that a detailed description of the right-hand synchronizer assembly only is believed necessary. The right-hand synchronizer assembly includes the spline piece 23 and a synchronizer ring 13. The spline piece 23 is fixedly mounted on a hub portion of change-speed gear 22 by means of a spline connection for rotation therewith. The spline piece 23 is formed at its left end with a conical portion **23*a* and thereon with the external spline teeth 23*b* which are chamfered at each end thereof. The synchronizer ring 13 is rotatably and axially slidably mounted on the conical portion 23*a* of spline piece 23 and has an internal conical surface 13*a* for frictional engagement with the surface of the conical portion 23*a* of spline piece 23. Thus, the synchronizer ring 13 cooperates with the spline piece 23** to provide a friction clutch in a well-known manner.

In this embodiment, the outer cylindrical hub portion **11*b* of hub member 11 is axially recessed in its circumferentially equi-spaced three portions. As can be well seen in Figs, 2, 3 and 4, the axially recessed portions each are formed as an axial groove 11*c*. The clutch sleeve 12 is formed at its inner periphery with circumferentially equi-spaced three internal radial projections 12*b* of large width which are axially shiftable in the axial grooves 11*c* of hub member 11. The clutch sleeve 12 is further formed at its inner periphery with a pair of internal radial projections 12*c* of small width which are arranged at opposite sides of the respective large width radial projections 12*b***.

Figure 3:
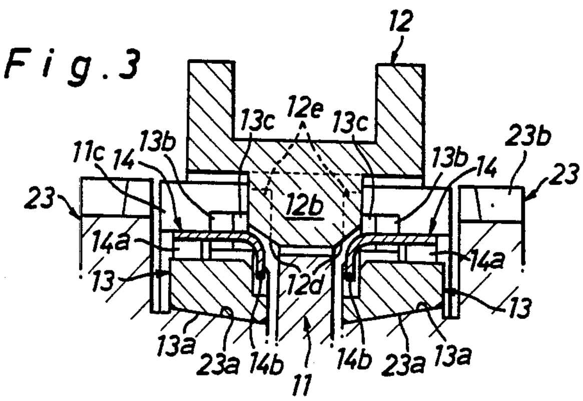
FIG. 3 is an enlarged cross-sectional view taken along line III—III in FIG. 2.
Figure 4:
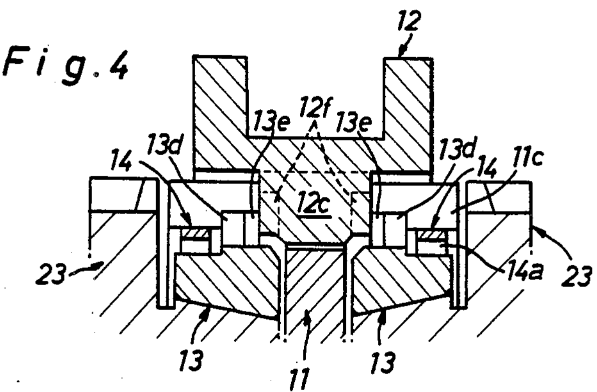
FIG. 4 is an enlarged cross-sectional view taken along line IV—IV FIG. 2.
Figure 6:
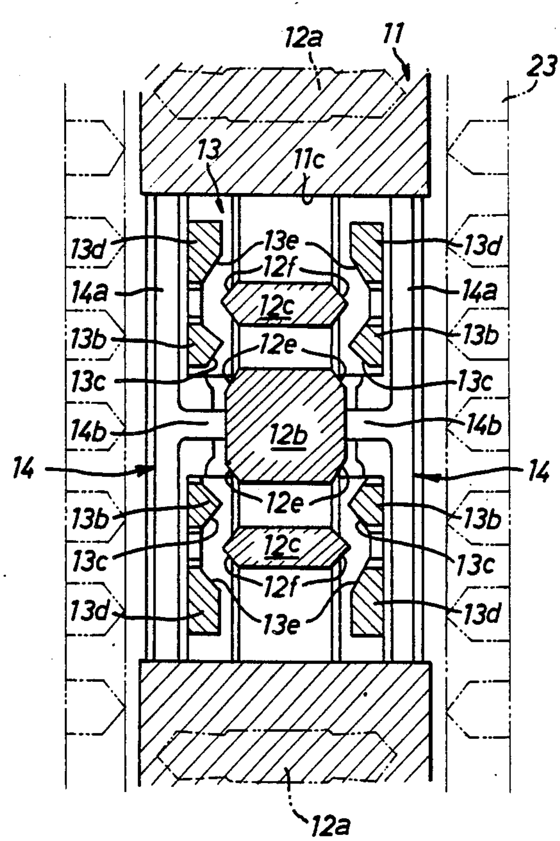
FIG. 6 is an enlarged partial view taken along line VI—VI in FIG. 2, showing the relative positions of the clutch sleeve, the synchronizer ring and the spline piece illustrated in FIGS. 1 to 5.

As can be well seen in FIGS. 3 and 6, the large width radial projections **12*b* each are formed at their inner end corners with tapered surfaces 12*d* and at their side corners with chamfers 12*e*. The large width radial projections 12*b* are respectively arranged between a pair of raised portions 13*b* which are integrally formed on the synchronizer ring 13 and circumferentially equi-spaced. The raised portions 13*b* each are formed at their inner ends with a pair of chamfers 13*c* which are engageable with the chamfers 12*e* of large width radial projections 12*b*, respectively. As can be well seen in FIGS. 4 and 6, the small width radial projections 12*c* each are formed at their opposite ends with chamfers 12*f* and are arranged between the raised portion 13*b* and another raised portion 13*d* formed on the synchronizer ring 13 adjacent the respective raised portions 13*b*. The raised portions 13*d* each are formed at their inner ends with a chamfer 13*e* which is engageable with the chamfer 12*f* of small width radial projection 12*c***.

As can be well seen in FIGS. 2 and 3, the radially contractible annular resilient member 14 includes a C-letter shaped ring portion **14*a* which is formed at opposite ends thereof with a pair of axial legs 14*b* and at an intermediate portion thereof with an axial leg 14*b*. The ring portion 14*a* of resilient member 14 is formed larger in diameter than the inner circumference of outer cylindrical hub portion 11*b* of hub member 11 and supported in place by engagement with the inner circumference of hub portion 11*b* in the presence of a radial force imposed thereto. The axial legs 14*b* of resilient member 14 each extend from the ring portion 14*a* toward the internal radial projection 12*b* of clutch sleeve 12 through an axial groove between the raised portions 13*b* and 13*b* of synchronizer ring 13. The axial legs 14*b* of spring 14 each are formed with a radial projection which is arranged between the inner end surface of synchronizer ring 13 and the tapered surface 12*d* of the internal radial projection 12*b* of clutch sleeve 12**.

In shifting operation of the clutch sleeve 12 toward the spline piece 23, the axial legs **14*b* of spring 14 are slightly moved in an axial direction by engagement with the tapered surfaces 12*d* of large width radial projections 12*b* at their inner shoulders such that each radial projection of axial legs 14*b* abuts against and urges the synchronizer ring 13 toward the spline piece 23 which will effect frictional engagement of the internal conical surface 13*a* of synchronizer ring 13 and the surface of the conical portion 23*a* of spline piece 23. Simultaneously, the axial movement of clutch sleeve 12 will be resisted by the balk action or engagement between the chamfers 12*e*, 12*f* of large and small width radial projections 12*b* and 12*c* and the chamfers 13*c*, 13*e* of raised portions 13*b* and 13*d*. When the thrust pressure acting on resilient member 14 exceeds a predetermined value, synchronization between the relative rotating parts is established, and the large width radial projections 12*b* of clutch sleeve 12 ride over the axial legs 14*b* of resilient member 14 thereby compressing them radially inwardly. This permits the radial projections 12*b*, 12*c* of clutch sleeve 12 to pass through axial grooves respectively formed between the raised portions 13*b* and 13*d* of synchronizer ring 13. Thus, the internal splines 12*a* of clutch sleeve 12 will be brought into engagement with the external spline teeth 23*b* of spline piece 23** to accomplish the synchronization.

From the above description, it will be understood that the gear synchronizer mechanism is characterized by provision of the clutch sleeve 12 which is integrally formed at its inner periphery with the circumferentially equi-spaced large and small width radial projections **12*b* and 12*c* to be engaged at their chamfered ends 12*e*, 12*f* with the chamfers 13*c*, 13*e* of raised portions 13*b*** and 13*d* on synchronizer ring 13. With this arrangement, it is advantagous that even if the number of large width radial projections 12*b* is reduced to form a sufficient number of internal spline teeth on the clutch sleeve 12 for reliable torque transmission, the small width radial projections 12*c* can be formed to increase the number of intermeshed portions between the clutch sleeve 12 and the synchronizer ring 13 thereby to decrease the pressure acting on the respective chamfers 12*e*, 12*f* of radial projections 12*b* and 12*c*. This serves to enhance the durability of clutch sleeve 12.

Having now fully set forth both structure and operation of a preferred embodiment of the concept underlying the present invention, various other embodiments as well as certain variations and modifications of the embodiment herein shown and described will obviously occur to those skilled in the art upon becoming familiar with the underlying concept. It is to be understood, therefore, that within the scope of the appended claims, the invention may be practiced otherwise than as specifically set forth herein.

What is claimed is:

1. In a gear synchronizer assembly comprising a gear member rotatable on a transmission shaft, a spline piece mounted on said gear member for rotation therewith and being formed at one side thereof with a conical portion and thereon with external spline teeth, a synchronizer ring mounted on the conical portion of said spline piece for frictional engagement therewith, a hub member fixedly mounted on said shaft for rotation therewith and having a cylindrical hub portion encircling said synchronizer ring and formed thereon with external spline teeth, a clutch sleeve encircling the cylindrical hub portion of said hub member and having internal spline teeth in continual engagement with the external spline teeth of said hub member, said clutch sleeve being axially shiftable toward and away from said gear member to be engaged at the internal spline teeth thereof with the external spline teeth of said spline piece, and thrust means for thrusting said synchronizer ring toward said spline piece in shifting operation of said clutch sleeve toward said gear member to effect frictional engagement of said synchronizer ring with said spline piece, the improvement wherein said clutch sleeve is formed at an inner periphery with a first internal radial projection of large circumferential width and a pair of circumferentially spaced second internal radial projections of small circumferential width arranged at opposite sides of the first internal radial projection, the first and second internal radial projections each being formed at one side thereof with a pair of chamfers and being axially movable in corresponding axial grooves formed in the cylindrical hub portion of said hub member, wherein said synchronizer ring is formed thereon with a pair of raised portions which are arranged to be engaged with the first internal radial projection, said synchronizer ring being further formed thereon with another pair of raised portions which are arranged to be engaged with the second internal radial projections, and wherein said thrust means comprises a radially contractible annular resilient member supported in place by engagement with an inner circumference of the cylindrical hub portion of said hub member, said resilient member having an axial leg extending therefrom toward the first internal radial projection of said clutch sleeve and having a radial projection arranged to be brought into engagement with the first internal radial projection of said clutch sleeve in shifting operation of said clutch sleeve toward said gear member and being arranged to abut against and urge said synchronizer ring toward said spline piece upon engagement with the first internal radial projection of said clutch sleeve, the axial leg of said resilient member being arranged to be compressed radially inwardly by engagement with the first internal radial projection of said clutch sleeve.

2. A gear synchronizer assembly according to claim 1, wherein the first internal radial projection of said clutch sleeve is formed at an inner end with a tapered surface engageable with an innner shoulder of the axial leg of said annular resilient member.

3. A gear synchronizer assembly according to claim 1, wherein three equi-spaced first internal radial projections are formed at the inner periphery of said clutch sleeve, and wherein said radially contractible annular resilient member includes a C-letter shaped ring portion which is formed at oppposite ends thereof with a pair of circumferentially spaced axial legs and at an intermediate portion thereof with an axial leg, eabh of said axial legs extending from said ring portion toward a corresponding first internal radial projection of said clutch sleeve, and each of said axial legs having a radial projection arranged to be brought into engagement with the coresoonding first internal radial projection of said clutch sleeve.

4. In a gear synchronizer assembly comprising a gear member rotatable on a transmission shaft, a spline piece mounted on said gear member for rotation therewith and being formed at one side thereof with a conical portion and thereon with external spline teeth, a synchronizer ring mounted on the conical portion of said spline piece for frictional engagement therewith, a hub member fixedly mounted on said shaft rotation therewith and having a cylindrical hub portion encircling said synchronizer ring and formed thereon with external spline teeth, a clutch sleeve encircling the cylindrical hub portion of said hub member and having internal spline teeth in continual engagement with the external spline teeth of said hub member, said clutch sleeve being axially shiftable toward and away from said gear member to be engaged at the internal spline teeth thereof with the external spline teeth of said spline piece, and thrust means for thrusting said synchronizer ring toward said spline piece in shifting operation of said clutch sleeve toward said gear member to effect frictional engagement of said synchronizer ring with said spline piece, the improvement wherein said clutch sleeve is formed at an inner periphery with a first internal radial projection of large circumferential width and a pair of circumferentially spaced second internal radial projections of small circumferential width arranged at opposite sides of the first internal radial projection, the first and second internal radial projections each being formed at one side thereof with a pair of chamfers and being axially movable in corresponding axial grooves formed in the cylindrical hub portion of said hub member, wherein said synchronizer ring is formed thereon with a pair of raised portions which are arranged to be engaged with the first internal radial projection, said synchronizer ring being further formed thereon with another pair of raised portions which are arranged to be engaged with the second internal radial projections, and wherein said thrust means comprises a radially contractible annular resilient member arranged in surrounding relationship with said synchronizer ring and axially slidably supported in place by engagement with an inner circumference of the cylindrical hub portion of said hub member, said resilient member having an axial leg extending therefrom toward the first internal radial projection of said clutch sleeve and having a radial projection arranged to be brought into engagement with the first internal radial projection of said clutch sleeve in shifting operation of said clutch sleeve toward said gear member and being arranged between said hub member and said synchronizer ring to abut against and urge said synchronizer ring toward said spline piece upon engagement with the first internal radial projection of said clutch sleeve, the axial leg of said resilient member being arranged to be compressed radially inwardly by engagement with the first internal radial projection of said clutch sleeve.

* * * * *